United States Patent
Vedsted et al.

(12) 
(10) Patent No.: US 6,729,622 B2
(45) Date of Patent: May 4, 2004

(54) READY-TO-MOUNT AXIAL FACE SEAL

(75) Inventors: Per Frost Vedsted, Bjerringbro (DK); Helge Grann, Bjerringbro (DK); Carsten H. Pedersen, Bjerringbro (DK)

(73) Assignee: Grundfos A/S, Bjerringbro (DK)

( * ) Notice: Subject to any disclaimer, the term of this patent is extended or adjusted under 35 U.S.C. 154(b) by 0 days.

(21) Appl. No.: 10/085,173

(22) Filed: Feb. 27, 2002

(65) Prior Publication Data

US 2002/0125648 A1 Sep. 12, 2002

(51) Int. Cl.$^7$ ................................. F16J 15/34
(52) U.S. Cl. .................. 277/371; 277/389; 277/390
(58) Field of Search .................. 277/358, 370, 277/371, 374, 375, 389, 390, 391

(56) References Cited

U.S. PATENT DOCUMENTS

| | | | | |
|---|---|---|---|---|
| 2,797,940 A | * | 7/1957 | Michener, Jr. et al. | 277/353 |
| 2,818,284 A | * | 12/1957 | Stevens | 277/370 |
| 4,142,835 A | * | 3/1979 | Hisada | 416/162 |
| 4,538,821 A | * | 9/1985 | Wallace | 277/374 |
| 4,625,977 A | * | 12/1986 | Azibert et al. | 277/361 |
| 4,989,882 A | * | 2/1991 | Warner et al. | 277/370 |
| 5,180,297 A | * | 1/1993 | Hansen et al. | 418/104 |
| 5,544,897 A | * | 8/1996 | Di Pietro et al. | 277/389 |
| 6,357,753 B1 | * | 3/2002 | Yamasaki et al. | 277/372 |
| 6,460,858 B1 | * | 10/2002 | Kitajima et al. | 277/370 |

FOREIGN PATENT DOCUMENTS

| | | |
|---|---|---|
| DE | 3507819 | 9/1986 |
| DE | 29704914 U1 | 8/1997 |
| GB | 9308748.9 U1 | 8/1993 |
| JP | 10009278 A * | 1/1998 ............ F16D/3/26 |

OTHER PUBLICATIONS

Mechanical Seals—Principled Dimensions, Designation and Material Codes; English Version EN 12756: 2000.

* cited by examiner

Primary Examiner—Anthony Knight
Assistant Examiner—Vishal Patel
(74) Attorney, Agent, or Firm—Jacox Meckstroth & Jenkins

(57) ABSTRACT

The ready-to-mount axial face seal comprises a rotating unit of a shaft protection sleeve pushable over the pump shaft with a longitudinal section projecting out of the housing of the pump and fastenable to this shaft, with a spring-loaded axial face seal ring surrounding the shaft protection housing and with an elastic sealing ring in the shaft protection sleeve as well as a stationary unit, surrounding the shaft protection sleeve, of a counter ring on which the axial face seal ring bears and of an assembly part for fastening the axial face seal on the pump housing. In relation to the diameter of the pump shaft the wall thickness of the shaft protection sleeve is smaller than with the known shaft protection sleeve. Furthermore the outer diameter of the axial face seal ring and of the counter ring in relation to the same diameter of the pump shaft is an associated standard diameter of an axial face seal without shaft protection sleeve. Such an axial face seal may be applied into a standardised mounting space which is envisaged for a standard axial face seal without shaft protection sleeve.

24 Claims, 2 Drawing Sheets

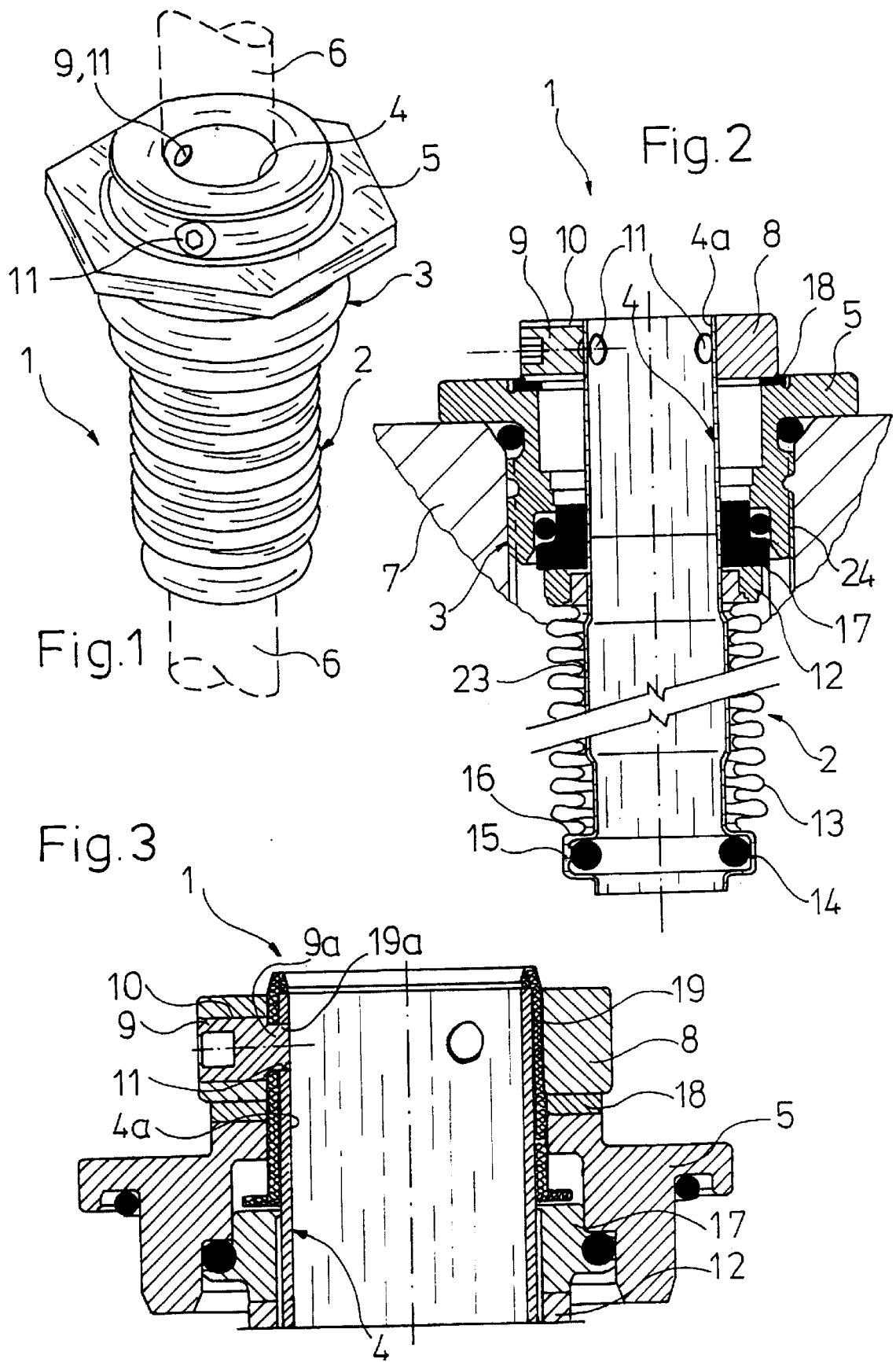

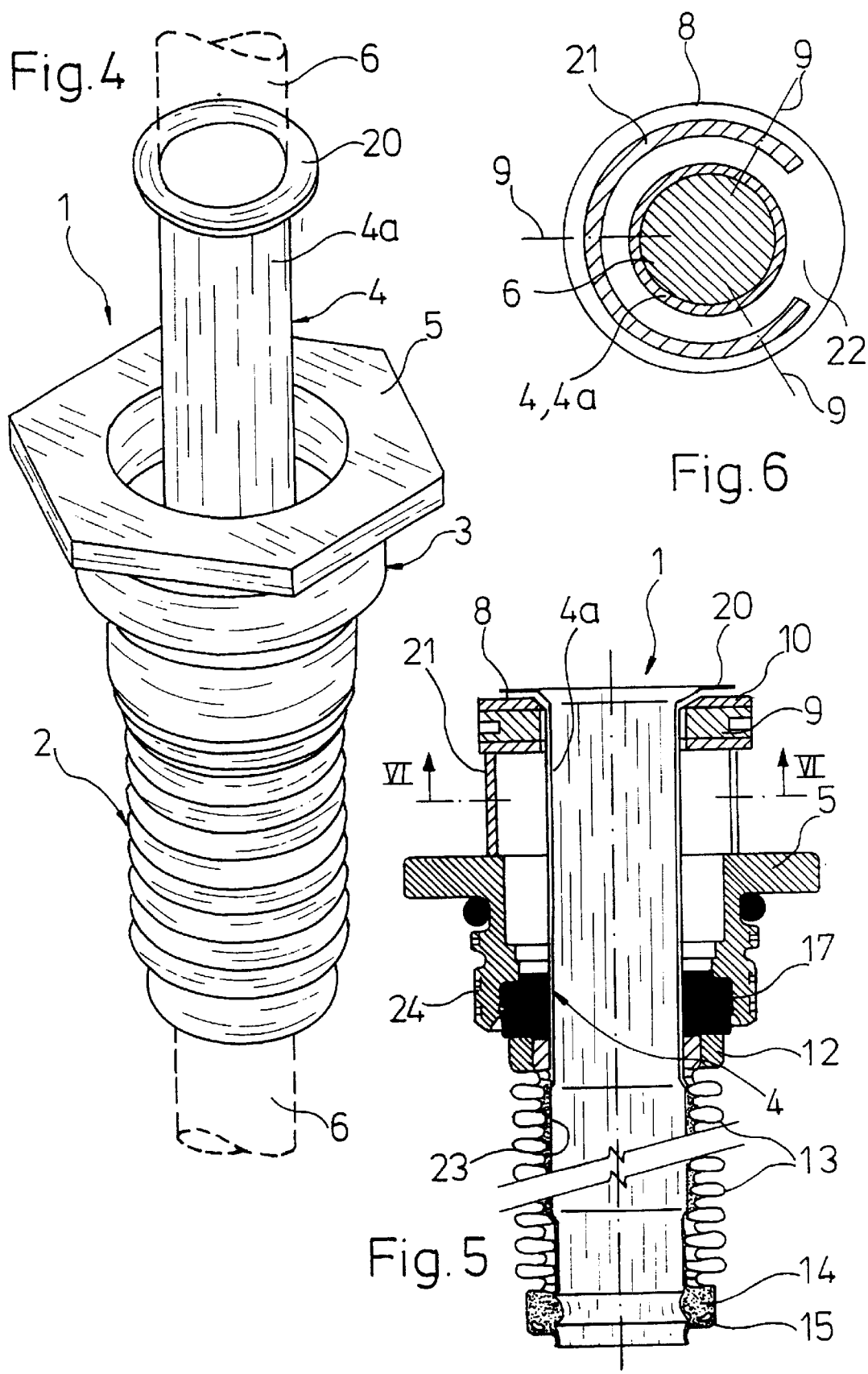

READY-TO-MOUNT AXIAL FACE SEAL

BACKGROUND OF THE INVENTION

The invention proceeds from a ready-to-mount axial face seal, according to the introductory part of claim 1, for the shaft of a pump, wherein the shaft may be coupled to a drive motor.

Such axial face seals forming a coherent construction unit and having a so-called shaft protection sleeve and which on the market are obtainable under the description cartridge or magazine seal, are known. They comprise essentially the shaft protection sleeve and two units assembled thereupon, specifically a rotating unit, which amongst other things comprises the rotating axial face seal ring, a compression spring axially loading this with a pregiven value as well as an inner elastic sealing ring, and a stationary unit, which amongst other things comprises the stationary counter ring for the rotating axial face seal ring and and an assembly part for the screw fastening of the axial face seal to the housing end wall of a pump. The longitudinal section of the shaft protection sleeve which projects out of the housing end wall when the axial face seal is mounted comprises at its free end e.g. an integral collar which is thicker in relation to the wall thickness of the shaft protection sleeve, with several radial threaded holes in which there are seated screws for fastening the shaft protection sleeve on the shaft of the pump.

For axial face seals of this known type in the end wall of the pump housing there is provided a special mounting space fixed by the pump manufacturer. The expensive pumps equipped with this seal provide a high power of 25 KW and larger and have a shaft diameter which as a rule is larger than 30 mm. For pumps with a considerably lower power, whose shaft has a diameter of 8 to 30 mm, there is applied an axial face seal design standardised according to DIN standards, which comprises no shaft protection sleeve and for which there is to be applied a mounting space standardised to the desired shaft in each case in the end wall of the pump housing. In the case of a defect of such a standard seal the exchange of this is time-consuming and expensive since the pump in the region of the seal to a considerable extent must be disassembled and again reassembled, which also applies to the individual parts of the standard seal, and for these working procedures there are required specialised personnel. Furthermore the use of a ready-to-mount axial face seal of the cartridge type in a standardised mounting space and thus the exploitation of the advantage of a rapid exchange of such an axial face seal is not possible since an axial face seal of the cartridge type, thus with a shaft protection sleeve, does not fit into the standardised mounting space since this mounting space in diameter is too small for the axial face seal of the cartridge type larger in outer diameter.

SUMMARY OF THE INVENTION

The object of the present invention lies in improving a ready-to-mount axial face seal of the above mentioned type to the extent that it is suitable for application in a standardised mounting space for a standard axial face seal design without a shaft protection sleeve.

The solution of this object is specified in patent claim 1.

The solution according to the invention permits the exploitation of the advantage of the axial face seal of the cartridge construction type, specifically its quick and inexpensive exchangeability in the case of a defect, also with those standardised mounting spaces which are envisaged for axial face seal designs standardised according to DIN, without shaft protection sleeve. Such mounting spaces and the associated standard axial face seal dependent on the shaft diameter of the pump selected in each case are used for centrifugal pumps with a smaller power of about 0.35 KW to 25.0 KW and with a pump shaft diameter of about 8 to 30 mm. These pumps are manufactured in large series and are therefore inexpensive in manufacture so that an exchange of a defect standard axial face seal with such a pump for reasons of cost is uneconomical and therefore mostly leads to a scrapping of the pump. With the axial face seal according to the invention the corresponding repair costs with cheap pumps of the previously mentioned type are however considerably reduced since a disassembly and a renewed assembly of the end wall of the pump housing including the individual sealing location are no longer required and may be effected by trained personnel. A defect cartridge seal according to the invention may be quickly exchanged since it itself needs only to be released from the pump end wall and the pump shaft after previously the drive motor has been decoupled from the pump, whereupon the defect cartridge seal is pulled off from the pump shaft. The assembly procedures for a new axial face seal according to the invention of the cartridge type is effected in reverse succession. Apart from the renewed use of the pump a further advantage of the axial face seal according to the invention lies in the fact that the user may select such a pump independently of whether he wishes to have mounted therein an axial face seal according to the invention or a known standard axial face seal.

BRIEF DESCRIPTION OF THE DRAWINGS

The invention is hereinafter explained in more detail by way of an embodiment example shown in the accompanying drawings. There are shown in FIG. 1 a first embodiment form of the invention in a perspective view, FIG. 2 an axial section through the embodiment example according to FIG. 1, FIG. 3 a modified embodiment form, which is shown partly and in the axial section, FIG. 4 a second embodiment form of the invention in a perspective view, FIG. 5 an axial section of the embodiment example according to FIG. 4, FIG. 6 a cross section according to line VI—VI in FIG. 5.

DETAILED DESCRIPTION OF THE INVENTION

The ready-to-mount axial face seal indicated generally at 1 comprises a rotating unit 2, whose construction may be clearly recognised in FIG. 2., with a shaft protection sleeve 4, and a stationary unit 3 with an assembly part 5 with which the axial face seal 1 is fastened to a partly shown pump housing 7. The axial face seal 1 is seated on a shaft 6, indicated dashed in FIG. 1, of a centrifugal pump (not shown), wherein the shaft has a diameter of about 8.0 to 30.0 mm. The pump musters a power which lies between 0.35 KW to 25.0 KW, and is driven by an electrical drive motor (not shown), wherein the drive shaft of the motor is coupled to the pump shaft 6 in a conventional manner, for example by way of a clamp coupling. The pump is therefore a pump with a relatively low output and accordingly has a pump shaft which has a relatively small diameter.

Furthermore the shaft protective sleeve 4 on its longitudinal section 4a projecting out of the pump housing 7 comprises a loose fastening ring 8 which on the outside is positioned on the section 4a by way of several screws 9. The screws 9 are seated in radial threaded holes 10 of the fastening ring 8. There are for example provided three screws 9, and specifically corresponding to the three holes 11 in the longitudinal section 4a of the shaft protection sleeve 4. The screws 9 are formed at the front end such that they may engage through the holes 11 as may be seen better in FIG. 3, in order amongst other things to be able to fasten the axial face seal 1 on the pump shaft 6.

The rotating unit 2 comprises further a shape-stable axial face seal ring 12, a compression spring 13 which exerts an axial spring force on the axial face seal ring 12 and an inner elastic sealing ring 14, e.g. an O-ring. The elastic sealing ring 14 is located in a radially outwardly directed beading shaping 15 which is provided at the inner end of the shaft protection sleeve 4. The beading shaping 15 simultaneously provides an outer shoulder 16 which forms a rest surface for the compression spring 13. The compression spring 13, may, as shown, be a metallic bellows or also a spiral spring.

The stationary unit 3 which surrounds the shaft protection sleeve 4 consists essentially of the assembly part 5 and of a counter ring 17 which is held by the assembly part and on which the axial face seal ring 12 axially bears by way of the force of the compression spring 13. The axial face seal ring 12 and the counter ring 17 form the known radial sealing elements of the axial face seal 1 and consists of material known for this sealing purpose.

The shaft protection sleeve 4 which consists essentially of stainless steel and preferably of drawn tube material has a small wall thickness. This wall thickness is one which is smaller than the wall thickness of the shaft protection sleeve for an axial face seal of the cartridge type known up to now. With reference to the diameter of the respectively selected diameter of the pump shaft onto which the shaft protection sleeve 4 is pushed, the wall thickness of the shaft protection sleeve is 1.5% to 6% and preferably 2% to 4%. Preferably the smaller number values apply to a larger shaft diameter and vice-versa. The two sealing rings, that is to say the axial face seal ring 12 and the counter ring 17 have an outer diameter which in relation to the selected diameter of the pump shaft 6 is the associated DIN standard diameter. The standard diameter required in each case may be deduced from the respective DIN-standard which is valid for axial face seal combinations without shaft protection sleeve. By way of this DIN-standard also simultaneously the respective associated mounting space in the pump housing 7, that is to say in the corresponding end wall of the pump housing is fixed for the associated axial face seal design without a shaft protection sleeve. Thus it is possible for the above mentioned axial face seal 1 with a shaft protection sleeve 4 to be applied into an mounting space of a pump housing 7 which is dimensioned for an DIN axial face seal design without a shaft protection sleeve.

Advantageously the axial face seal 1 according to FIG. 2 between the assembly part 5 and the fastening ring 8 comprises a distancing means for presetting a certain bearing pressure of the axial face seal ring 12 on the counter ring 17. The distancing means is for example a closed ring part of about 1 mm to 2 mm thickness and fixes in combination with the spring force of the compression spring 13 the bearing pressure of the axial face seal ring 12 on the counter ring 17. The distancing means is of lubricative material, e.g. of teflon and further has the property that it wears somewhat on operation of the axial face seal 1 assembled on the pump shaft 6, so that thereafter there prevails practically no friction between the parts 5, 8 and 18, the preset axial spring force of the compression spring 13 for the bearing pressure of the axial face seal ring 12 on the counter ring 17 however is retained.

In order to improve the positioning of the fastening ring 8 on the shaft protection sleeve 4 the axial face seal 1 according to FIG. 3 may comprise a securement sleeve 19 on its projecting longitudinal section 4a. This securement sleeve consists for example of plastic and adheres with an interference fit on the section 4a. Furthermore the securement sleeve 19, corresponding to the number of holes 11 of the sleeve 4, is provided with the same number of holes 19a so that there are formed flush pairs of holes 11, 19a, into which the screws 9 of the fastening ring 8 engage. For this the screws 9 may be preferably provided with a peg 9a. The sleeve 19 has the effect that the fastening ring 8 is positioned more securely on the shaft protection sleeve. Otherwise the embodiment form of the axial face seal 1 according to FIG. 3 in its design corresponds to that according to FIG. 2.

In FIGS. 4, 5 and 6 there is shown a second embodiment form of an axial face seal 1 with a shaft protection sleeve 4. The main difference to the embodiment form according to the FIGS. 1 to 3 lies in the fact that the free end of the projecting longitudinal section 4a of the shaft protection sleeve comprises a radially outwardly directed contact formation 20 for the fastening ring 8 of the shaft protection sleeve 4, wherein the fastening ring in FIG. 4 is omitted for the purpose of a better overview. The contact formation 20 consists preferably of a bent up circumferential edge of the free end of the shaft protection sleeve 4, as FIG. 4 clearly shows. The shaft protection sleeve 4 is with this embodiment form not provided with holes since a suitable friction-fit fastening of the shaft protection sleeve on the pump shaft 6 may also be effected in that the radial screws 9 of the fastening ring 8 press against the shaft protection sleeve 4 and the sleeve 4 by way of this is pressed rigidly against the pump shaft 6. However also holes 11 may be provided as with the example according to the FIGS. 1 to 3.

In order to be able to set the desired bearing force of the axial face seal ring 12 on the counter ring 17 by way of the compression spring also with this embodiment example already at the place of manufacture, also in this case there is provided a distancing means between the fastening ring 8 and the assembly part 5. In the case shown here the distancing means consists of a ring part which surrounds in a sleeve-like manner the projecting longitudinal section 4a of the shaft protection sleeve 4, but which is however removable. The axial length of the ring part 21 in cooperation with the axial compression spring 13 determines the bearing force with which the rotating axial face seal ring 12 is pressed against the stationary counter ring 17. With a given axial force of the compression spring 13 in combination with differently high ring parts 21 it is possible to set a desired bearing force of the axial face seal ring 12 on the counter ring 17 for the respective application case.

After the axial face seal 1 is assembled on the pump housing and on the pump shaft the sleeve-like ring part 21 is removed. For this the ring part 21 is advantageously provided with a wide axial slot 22 whose width corresponds at least to the outer diameter of the shaft protection sleeve 4. Thus in a simple manner it is possible to laterally push out the ring part 21 between the fastening ring 8 and the assembly part 5. The remaining construction of this axial face seal embodiment form corresponds to that of the previously mentioned embodiment form of the axial face seal 1.

With all embodiment forms the shaft protection sleeve 4 of a small diameter in the longitudinal region of the axial compression spring 13 may comprise an enlarged outer diameter for the axial guiding of the compression spring 13. Such an enlarged outer diameter of the shaft protection sleeve 4 is indicated at 23. The manufacture of such an enlarged outer diameter of the shaft protection sleeve 4 may be effected by expanding hydraulic compression moulding of the shaft protection sleeve. Also the radially outwardly directed beading shaping 15 of the shaft protective sleeve may be manufactured by hydraulic compression moulding.

The assembly part 5 of the stationary unit 3 is preferably a sleeve part with an outer thread 24 which is screwed into a suitable inner thread of the pump housing 7 or of the pump housing wall. Alternatively it is also possible in place of the outer thread 24 to provide an inner thread. Here the assembly part 5 then has a sleeve-shaped outer ring on whose inner side the inner thread is provided. Such an embodiment of the assembly part 5 is considered when the pump housing comprises a connection piece with an outer thread.

Furthermore the assembly part 5 on its outer circumference has a polygonal shape as FIGS. 1 and 4 show. This permits the tightening of the applied axial face seal 1 with a spanner.

In place of a fastening ring 8 for fastening the shaft protection sleeve 4 to the pump shaft 6 for example also the clamp coupling mentioned further above may be used. The shaft protection sleeve then has a suitably long projecting longitudinal section 4a whose free end is clamped tight by the clamp coupling on the pump shaft 6.

What is claimed is:

1. A ready-to-fit axial face seal for the shaft of a pump having a power of 0.35 KW to 25 KW and a shaft diameter of between 8 to 30 mm, wherein the shaft may be coupled onto a drive motor, wherein the axial face seal comprises a rotating unit of a shaft protection sleeve which is pushable over the pump shaft, with a longitudinal section projecting out of a housing of the pump and fastenable to this shaft, of a shape-stable axial face seal ring axially loaded with a spring force and surrounding the shaft protection sleeve, and of an elastic sealing ring in the shaft protection sleeve, as well as a stationary unit surrounding the shaft protection sleeve, of a shape-stable counter ring on which the axial face seal ring bears, and of an assembly part fastening the axial face seal on the housing of the pump, wherein the wall thickness of said shaft protection sleeve for said pump shaft having a diameter within a range of 8–30 mm is made smaller than is normally made within a value range of 1.5% to 6%, of the diameter of the pump shaft, and wherein the outer diameter value of said axial face seal ring of said rotating unit and the outer diameter value of said counter ring of said stationary unit are standard diameter values chosen, for pump shaft diameters ranging from 8 to 30 mm, from a standard axial face seal construction without having a shaft protection sleeve.

2. An axial face seal according to claim 1, wherein the shaft protection sleeve has a wall thickness which is 2% to 4% of the diameter of the pump shaft.

3. An axial face seal according to claim 1, wherein on the projecting longitudinal section of the shaft protection sleeve there is positioned a loose fastening ring with radial threaded holes with screws for fastening the shaft protection sleeve on the pump shaft.

4. An axial face seal according to claim 3, wherein the projecting longitudinal section of the shaft protection sleeve comprises several holes distributed circumferentially, into which the screws of the fastening ring engage.

5. An axial face seal according to claim 4, wherein on the projecting longitudinal section of the shaft protection sleeve there is seated a securement sleeve with several holes which are flush with the associated holes of the shaft protection sleeve and wherein the screws of the fastening ring engage into the respective flush hole pairs.

6. An axial face seal according to claim 3, wherein the free end of the projecting longitudinal section of the shaft protection sleeve comprises a radially outwardly directed bearing formation for the fastening ring of the shaft protection sleeve.

7. An axial face seal according to claim 6, wherein the bearing formation consists of a bent-up circumferential edge of the free end of the shaft protection sleeve.

8. An axial face seal according to claim 3, wherein at least one distancing means is provided between the fastening ring and the assembly part of the stationary unit for presetting a certain bearing pressure of the axial face seal ring on the counter ring.

9. An axial face seal according to claim 8, wherein the distancing means consists of a removable ring part surrounding the projecting longitudinal section of the shaft protection sleeve.

10. An axial face seal according to claim 9, wherein the removable ring part comprises an axial slot whose width corresponds at least to the outer diameter of the shaft protection sleeve.

11. An axial face seal according to claim 8, wherein the distancing means consists of a closed ring part of lubricative material wearing somewhat on operation of the axial face seal.

12. An axial face seal according to claim 1, wherein the shaft protection sleeve consists of drawn raw material of stainless steel.

13. An axial face seal according to claim 1, wherein the shaft protection sleeve at its end comprises a radially outwardly directed beading formation for receiving the elastic sealing ring of the rotating unit.

14. An axial face seal according to claim 13, wherein the outer shoulder of the beading formation forms a support surface for the spring force of the rotating unit.

15. An axial face seal according to claim 1, wherein the spring force is formed by a metallic bellows or by way of a spiral-shaped compression spring and wherein the shaft protection sleeve in the region of the bellows or the compression spring has an enlarged outer diameter for the axial guiding of the bellows or the compression spring.

16. An axial face seal according to claim 1, wherein the assembly part of the stationary unit comprises a sleeve part with an outer thread or inner thread for fastening the axial face seal on the pump housing.

17. An axial face seal according to claim 16, wherein the assembly part on its outer circumference has a polygonal shape.

18. An axial face seal according to claim 13, wherein the beading formation and/or the enlarged outer diameter of the shaft protection sleeve is manufactured by hydraulic compression moulding of shaft protection sleeve.

19. An axial face seal according to claim 1, wherein on the projecting longitudinal section of the shaft protection sleeve there is positioned a loose fastening ring with radial threaded holes with screws for fastening the shaft protection sleeve on the pump shaft.

20. An axial face seal according to claim 4, wherein at least one distancing means is provided between the fastening ring and the assembly part of the stationary unit for presetting a certain bearing pressure of the axial face seal ring on the counter ring.

21. An axial face seal according to claim 5, wherein at least one distancing means is provided between the fastening ring and the assembly part of the stationary unit for presetting a certain bearing pressure of the axial face seal ring on the counter ring.

22. An axial face seal according to claim 6, wherein at least one distancing means is provided between the fastening ring and the assembly part of the stationary unit for presetting a certain bearing pressure of the axial face seal ring on the counter ring.

23. An axial face seal according to claim 7, wherein at least one distancing means is provided between the fastening ring and the assembly part of the stationary unit for presetting a certain bearing pressure of the axial face seal ring on the counter ring.

24. An axial face seal according to claim 14, wherein the beading formation and/or the enlarged outer diameter of the shaft protection sleeve is manufactured by hydraulic compression moulding of shaft protection sleeve.

* * * * *